United States Patent [19]
Davenport et al.

[11] Patent Number: 6,088,334
[45] Date of Patent: Jul. 11, 2000

[54] SYSTEM AND METHOD FOR DETERMINING END-TO-END CHARACTERISTICS OF A DATA COMMUNICATION CHANNEL

[75] Inventors: Bert A. Davenport, Chicago; James A. Renkel, Warrenville; Peter P. Jankus, Chicago, all of Ill.

[73] Assignee: U. S. Robotics Access Corp., Skokie, Ill.

[21] Appl. No.: 08/816,699

[22] Filed: Mar. 13, 1997

[51] Int. Cl.⁷ ........................................ G01R 31/08
[52] U.S. Cl. ............................. 370/252; 370/248
[58] Field of Search ........................ 370/252, 248, 370/249, 465; 379/34; 37/222

[56] References Cited

U.S. PATENT DOCUMENTS

| | | |
|---|---|---|
| 4,161,627 | 7/1979 | Amann . |
| 4,730,302 | 3/1988 | Fuerlinger et al. . |
| 5,398,234 | 3/1995 | O'Connell et al. . |
| 5,528,679 | 6/1996 | Taarud ........................................ 379/34 |

FOREIGN PATENT DOCUMENTS

| | | |
|---|---|---|
| 43 43 982 | 8/1995 | Germany . |
| 1 417 627 | 12/1975 | United Kingdom . |

OTHER PUBLICATIONS

Ingle, J.F. "How to Detect Frame Slips in Voiceband PCM Channels" *Data Communications*, vol. 17, No. 11, Oct. 1988.

*Primary Examiner*—Hassan Kizou
*Assistant Examiner*—Mitchell Slavitt
*Attorney, Agent, or Firm*—McDonnell Boehnen Hulbert & Berghoff

[57] ABSTRACT

A method for determining characteristics of a data communication channel between first and second data communication devices. The method includes the step of sending a relatively low power digital probe signal over said channel from said first to said second data communication devices. The method further includes sending a second digital probe signal corresponding to an analog signal having a relatively high-frequency signal with a time-varying dc component from said first to said second data communication devices. The second data communication device receives a signal, said received signal corresponding to said probe signals sent by said first device. In addition, the second data communication device determines whether said received signal varies from a predetermined standard.

25 Claims, 4 Drawing Sheets

Microfiche Appendix Included
(1 Microfiche, 33 Pages)

FIG. 3

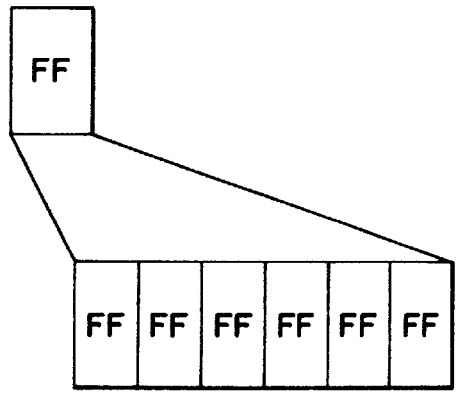

THE FF PATTERN IS DEFINED AS TRANSMITTING THE HEX BYTE FF REPEATEDLY

FIG. 4

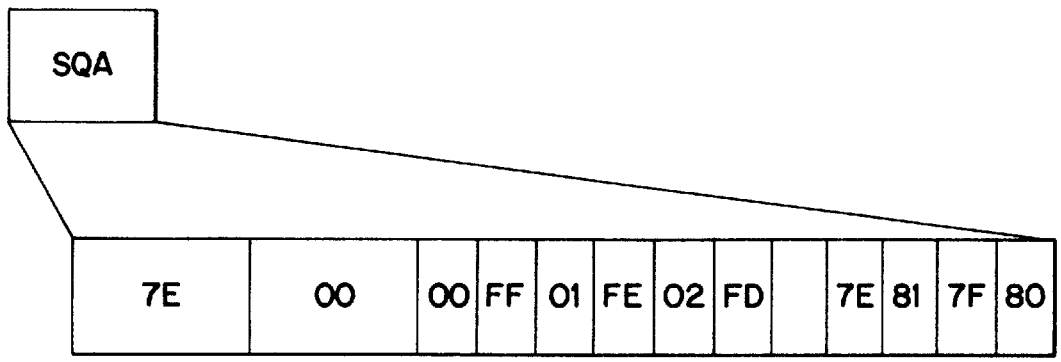

THE SQA PATTERN BEGINS WITH 7+6n BYTES OF 7E, WHERE n= 290. THIS IS FOLLOWED BY 7 BYTES OF 00. THIS IS FOLLOWED BY BYTES GENERATED BY AN INCREASING COUNTER FROM 00 TO 7F WHICH ARE INTERLEAVED WITH BYTES GENERATED BY A DECREASING COUNTER FROM FF TO 80. THE FULL SEQUENCE, AS DESCRIBED ABOVE IS ONE FULL PERIOD OF SQA. THIS SEQUENCE WILL REPEAT AS LONG AS THE TRANSMITTER IS IN THE SQA STATE.

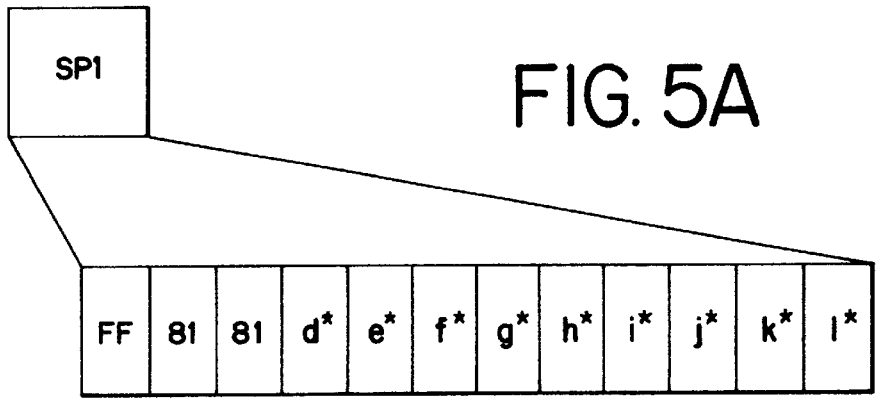

FIG. 5A

THE SP1 SEQUENCE CONSISTS OF ONE BYTE OF FF, TWO BYTES OF 81, AND 9 BYTES (d*-l*) OF INFORMATION. THE INFORMATION BYTES ALL HAVE THE MOST SIGNIFICANT BIT SET TO 0 AND THE LEAST SIGNIFICANT BIT SET TO 1, AND THE MIDDLE SIX BITS CONTAIN INFORMATION (DEFINED IN NEXT FIGURE.)

FIG. 5B d*: VERSION INFORMATION: 000000
e*: RESERVED FOR FUTURE USE: 000000
f*: ROBBED BIT SIGNALING POSITION: 1=RBS ON THIS BIT, 0=NO RBS ON THIS BIT
g*: MISCELANEOUS INFO: (BIT b0 IS THE LEAST SIGNIFICANT BIT)
    b6 = 0 (RESERVED FOR FUTURE USE)
    b5 = 0 (RESERVED FOR FUTURE USE)
    b4 = 1 TO USE ZERO BYTE SUPRESSION, 0 TO NOT USE zbs
    b3 = 1 TO SCRAMBLE THE DATA, 0 NOT TO SCRAMBLE THE DATA
    b2 = 1 IF THE CHANNEL IS "RESTRICTED", 0 IF THE CHANNEL IS UNRESTRICTED.
    b1 = 1 IF 64kbps SPEED IS SELECTED, 0 IF 64kbps SPEED NOT SELECTED
h*: SPEED BITS:
    b6 = 1 IF 62.6Kbps SELECTED. 0 = NOT SELECTED
    b5 = 1 IF 61.3Kbps SELECTED. 0 = NOT SELECTED
    b4 = 1 IF 60.0Kbps SELECTED. 0 = NOT SELECTED
    b3 = 1 IF 58.6Kbps SELECTED. 0 = NOT SELECTED
    b2 = 1 IF 57.3Kbps SELECTED. 0 = NOT SELECTED
    b1 = 1 IF 56.0Kbps SELECTED. 0 = NOT SELECTED
i*: CRC 4 BITS: 000CRCa1 (FIRST 4 BITS)
j*: CRC 4 BITS: 000CRCb1 (SECOND 4 BITS)
k*: CRC 4 BITS: 000CRCc1 (THIRD 4 BITS)
l*: CRC 4 BITS: 000CRCd1 (FOURTH 4 BITS)

THE E SEQUENCE CONSISTS OF ONE BYTE OF FF FOLLOWED BY THREE BYTES OF 81.

6,088,334

SYSTEM AND METHOD FOR DETERMINING END-TO-END CHARACTERISTICS OF A DATA COMMUNICATION CHANNEL

MICROFICHE APPENDIX

This application contains a microfiche appendix, which consists of one sheet of microfiche and a total of 33 frames.

BACKGROUND OF THE INVENTION

The present invention relates to a method and apparatus for detecting characteristics of a communication channel. In particular, the present invention may be utilized to determine if a communication channel is digital end-to-end. For example, the present method and apparatus may determine whether an Integrated Services Digital Network ("ISDN") to ISDN connection is all digital. Alternatively, the present method and apparatus may determine whether an ISDN to T1/E1, or T1/E1 to T1/E1, connection is all digital. Impairments in the digital connection may also be detected by the apparatus and method of the present invention.

For ISDN to ISDN connections, some known systems send digital data over a channel that is billed as analog. Such systems do not verify that the channel is actually digital before sending the data. Rather, such systems may simply follow the practice of "just trying" to blindly send digital data over what may be an analog link and "seeing" if it works. If the channel is believed to be digital, but is actually analog, the connection will fail.

For ISDN to T1/E1, or T1/E1 to T1/E1, connections, no known methods or apparatii provide high speed data transfer. If an ISDN to T1/E1, or T1/E1 to T1/E1, call is made with prior art systems, analog communication is typically provided (speeds up to 33.6 kbps full-duplex). In accordance with standard industry practice, communication occurs as if only over an analog link.

Accordingly, it would be desirable to have an improved method and apparatus for determining characteristics of a communication channel.

SUMMARY OF THE INVENTION

In accordance with the present invention, if the communication channel in an ISDN-to-ISDN connection is determined to be end-to-end digital, the data can be sent and billed as an analog call. In addition, if the communication channel is determined to be analog, then a second call attempt can be made requesting (and paying for) a digital call. Moreover, if an ISDN to T1/E1, or T1/E1 to T1/E1, connection is determined to be all digital, digital data transfer rates of up to 62.666 kbps/B channel full-duplex can be achieved utilizing the method and apparatus of the present invention.

It is an object of the present device and method to provide one or more of the following features or advantages:

Enable digital communication at up to 62.666 kbps full-duplex from ISDN to T1/E1, or T1/E1 to T1/E1;

Enable more robust and faster communication at up to 64 kbps full-duplex from ISDN to ISDN (BRI—Basic Rate Interface or PRI—Primary Rate Interface) connections while being billed for an analog call;

Determine whether any point-to-point GSTN (General Switched Telephone Network) communication channel is digital end-to-end;

Determine whether any communication channel is digital end-to-end;

Determine whether a G.711 CODEC (Coder-Decoder) is in the network path;

Determine if robbed bit signaling is present and determines the position and number of the robbed bits on an all-digital network;

Determine whether the network requires a minimum "one's density;"

Determine whether one or more digital attenuator pads are present in the connection;

Use a scrambler to prevent the network from compressing the data;

Use zero byte suppression to communicate digitally over a link that converts 00 to 02;

Determine if one or more robbed bits are present in a communication channel; and/or Determine where one or more robbed bits are located and use 100% of the remaining non-robbed bits for data.

DESCRIPTION OF THE DRAWINGS

FIG. 3 is a block diagram showing more fully the content of block FF in FIG. 2.

FIG. 4 is an expanded diagram of the contents of block SQA in FIG. 2.

FIGS. 5A and 5B are an expanded diagram of the contents of block SP1 in FIG. 2 and a tabular description of the contents, respectively.

DETAILED DESCRIPTION OF THE PREFERRED EMBODIMENT

Figure 1:
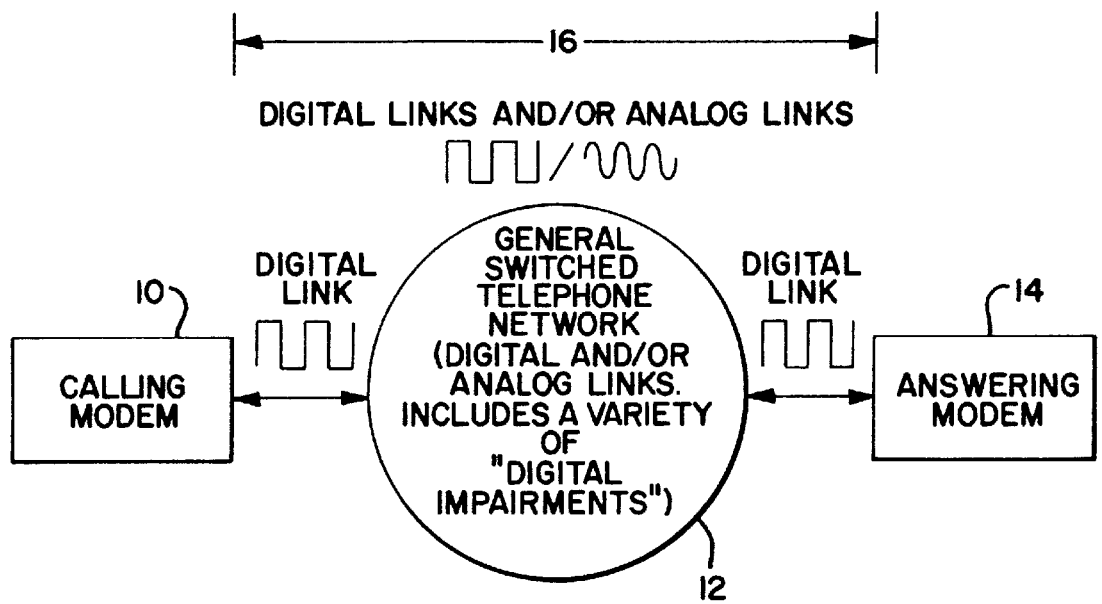
FIG. 1 is a block diagram showing a connection between two devices having digital connectivity to the telephone network.

FIG. 1 is a block diagram showing a connection between two devices having digital connectivity to the telephone network. A calling device 10 has a digital connection to the General Switched Telephone Network ("GSTN") 12. An answering device 14 also has a digital connection to the GSTN 12. At the beginning of a call between the calling device 10 and the answering device 14, certain characteristics of the GSTN are unknown.

Figure 2:
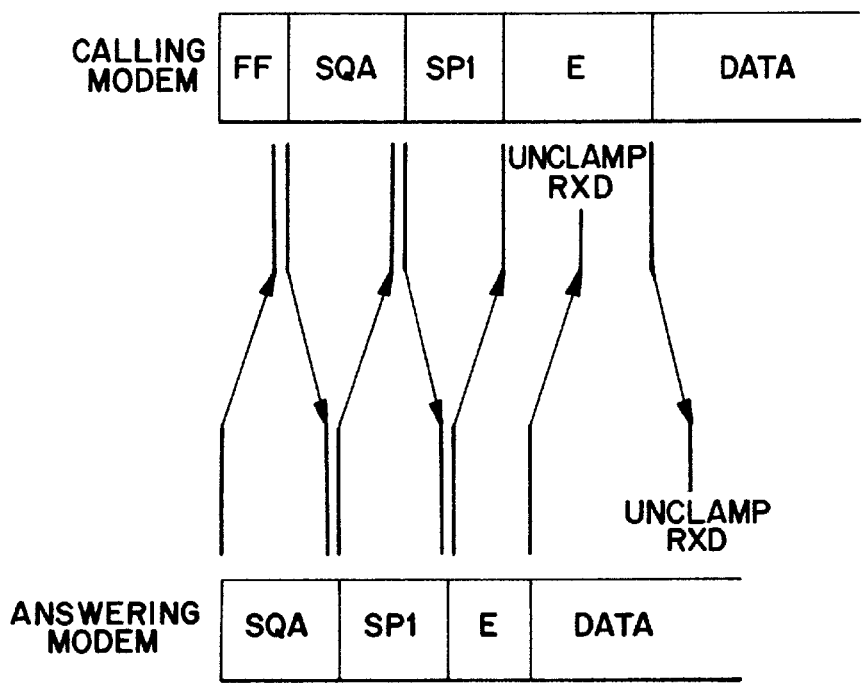
FIG. 2 is a block diagram showing a sequence of initial negotiations between the calling device and the answering device shown in FIG. 1.

FIG. 2 shows the negotiation between the calling and answering devices 10 and 14 using the present system. The calling and answering devices are preferably modems. The following is a description of what each of the modems 10, 14 is doing during negotiation over data communication channel 16, as shown in FIG. 1.

FIG. 1 shows a calling device 10 communicating over a data communication line 16 with an answering device 14. The line 16 may or may not include an analog segment. The devices 10,14 utilize the present system to determine the characteristics of the line 16, including whether the line 16 is entirely digital or it includes an analog segment and whether the line includes any digital impairments.

As used herein, digital impairments refers to limitations on the content of the data sent over the line, such as robbed bit signaling (RBS) or a restricted channel. With an RBS impairment, an entity, such as a telephone company, operating the line utilizes the least significant bit of selected (e.g., every sixth) byte for overhead purposes. With a restricted channel (rather than a nonrestricted channel), the data sent over the line must have a minimum one's density: there is a limitation on the number of zeros that may validly be placed in a consecutive series. (In some telecommunication systems, such ones density is used to ensure synchronization.)

In addition to digital impairments, regulatory bodies may impose a limitation on the maximum power that may be carried by the line 16. Such power limitations may restrict the energy (in terms of power) that a modem may transmit/receive during various time intervals of predetermined length, such as 250 milliseconds or 3 seconds.

Calling modem procedures

As shown in FIG. 2, the calling modem will transmit all marks (bytes of FF hex) until it receives the SQA sequence from the answering modem. The composition of the SQA sequence is shown in FIG. 4. The SQA sequence will allow the modem to determine the following:

Is the channel partially analog, or is it all digital?

If the channel is digital, what kinds of "digital impairments" does it contain?

How many and what are the locations of the RBS (robbed bit signaling) bits?

Is the channel restricted or unrestricted (i.e. does it have a minimum one's density requirement?

Does the channel have digital pads in it? If so, what kinds of pads are they?

Referring again to FIG. 2, upon receiving the SQA sequence from the answering modem, the calling modem will transmit the SQA sequence until it receives the SP1 sequence from the answering modem.

The SQA sequence, or probing signal, is shown more fully in FIG. 4. The sequence may thus be divided into three subparts: (1) 7+6 n bytes of 7E, where n is preferably 290; (2) 7 bytes of 00, and (3) a sequence of digital codewords, which corresponds to an analog signal with a 4,000 Hz frequency, ½ the maximum allowable amplitude, and an increasing dc offset voltage. The digital codewords are preferably eight bit PCM codewords or PCM codes.

The first subpart of SQA, 7E in FIG. 4, is a low power transmission. This allows the probing signal to meet the maximum power constraints imposed on the line by decreasing the average power transmitted during the SQA sequence. Also, the first subpart effectively "pads" the length of the probing signal, such that the length of the entire probing signal (all three subparts) is a multiple of 6 bytes. In this way, RBS may be more easily detected, since, in many environments, RBS occurs only in every sixth byte at DS0. Moreover, since the SQA sequence is known to the answering device and has a predetermined length, the location and number of robbed bits are determined from the SQA sequence.

The second subpart of SQA, 00 in FIG. 4, is sent by the calling modem to test whether the line is a restricted channel or a clear channel. The answering modem effectively knows that if the received signal includes ones in the portion corresponding to the second subpart of the probing signal, the telephone company has probably inserted ones in order to maintain a minimum one's density in the transmitted data. Thus, in such a case, the channel is restricted.

There may be several different one's density requirements imposed by differing transmission technologies in the underlying DS1, DS2, DS3, etc. For example, a very restrictive requirement is that no single PCM codeword can contain all zeros. This effectively limits the number of consecutive zeros to seven in the same PCM codeword, or fourteen zeros across two consecutive PCM codewords.

This type of density restriction may be satisfied, along with all other density restrictions, by inserting a 1 after each string of at most seven consecutive zeros. It should be noted that, since the insertion is done before the data is inverted for transmission, this algorithm may be implemented by inserting a zero after each string of at most seven ones. It should further be noted that the "zero bit insertion/deletion" (ZBID) scheme used with HDLC/SDLC specifies insertion of a zero after six consecutive ones in the data stream to avoid false flag patterns (0, 6 ones, 0). The flag pattern was chosen to be distinguishable from an abort pattern (0, 7 or more ones) and the idle pattern (continuous ones).

Accordingly, if there is either robbed bit signalling present or a one's density requirement, data transfer occurs at rates below 64 Kbps, such as 56 Kbps. Conversely, if the are no robbed bits and no one's density requirement, i.e. a 64 Kbps clear channel, data transfer may occur at 64 Kbps. In accordance with the preferred embodiment, data transfer rates in excess of 56 Kbps may be achieved, even in the face of robbed bit signalling and a one's density requirement.

The increasing dc offset voltage in the third subpart of SQA, 00, FF, . . . , 80 in FIG. 4, ensures that, for example, where the line utilizes a 256 level quantizer, all 256 levels are utilized in transmitting the probing signal. The quantizer may be for example a $\mu$-law quantizer, as is used in North America and Japan, or an A-law quantizer, as is used in Europe. In the digital domain, each of the quantizer levels may be represented by a different eight bit codeword. If the signal received by the answering device lacks the full range of the transmitted probing signal, the answering modem may effectively "know" of the digital coding system used in the line.

For example, the presence of a digital attenuator pad in the connection will cause the codewords in the third subpart of SQA to be adjusted in a fixed manner. The answering device, which knows what the third subpart should be, analyzes the received signal and may thereby identify the presence and characteristics of the pad.

The relatively high frequency and amplitude of the probe signal in the third subpart are difficult for an analog converter to translate. Indeed, in many telephone company lines, a filter substantially attenuates signals even approaching 4,000 Hz. If the received signal does not correspond to the transmitted probe signal, the answering modem may know that an analog segment lies in the line.

The total length of the probing signal used in the preferred embodiment is 256 a bytes+7 bytes+7 bytes+(290 * 6), or 2010, bytes long. The answering device monitors, during the entire predetermined probing signal, to detect whether the received signal has the least significant bit different than the least significant bit of the probe signal. If so, the answering modem effectively knows that the telephone company line utilizes RBS. In one embodiment, the modems then simply know to communicate at 56 kbps rather than, for example, 64 kbps. In other embodiments, the modems simply do not send data in the least significant bit ("LSB") of any byte because of RBS. The data transmission speed of such modems is accordingly limited to a top speed of 56 kbps.

FIG. 5 is an expanded diagram of the contents of block SP1 in FIG. 2. The SP1 sequence is an indication of capabilities of the modem and a request to turn on or off various features and speeds in the modem. Upon receiving the SP1 sequence from the answering modem, the calling modem will transmit the SP1 sequence until it receives the E sequence.

Figure 6:
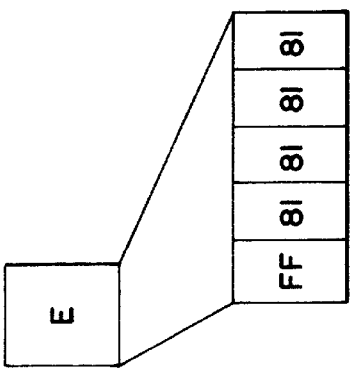
FIG. 6 is an expanded diagram of block E in FIG. 2.

FIG. 6 is an expanded diagram of block E in FIG. 2. Upon receiving the E sequence from the answering modem, the calling modem will transmit the E sequence (fixed length of 5 bytes) followed by data. Upon receiving the data from the answering modem, the calling modem will unclamp its receive data and will proceed to receive data from the answering modem.

Answering modem procedures

The answering modem will transmit the SQA sequence until it receives the SQA sequence form the calling modem. The SQA sequence will allow the modem to determine the following:

Is the channel partially analog, or is it all digital?

If the channel is digital, what kinds of "digital impairments" does it contain?

How many and what are the locations of the RBS (robbed bit signaling) bits?

Is the channel restricted or unrestricted (i.e. does it have a minimum one's density requirement?

Does the channel have digital pads in it? If so, what kinds of pads are they?

Upon receiving the SQA sequence from the calling modem, the answering modem will transmit the SP1 sequence until it receives the SP1 sequence from the calling modem. The SP1 sequence is an indication of capabilities and of the modem and a request to turn on or off various features and speeds in the modem. Upon receiving the SP1 sequence from the calling modem, the answering modem will transmit the E sequence (fixed length of 5 bytes) followed by data. Upon receiving the data from the calling modem, the calling modem will unclamp its receive data and will proceed to receive data from the calling modem.

One aspect of the present system relates to the detection stage: by sending the SQA pattern, the present system has the ability to:

1) detect if the channel is digital end-to-end 2) detect the exact number and location of RBS 3) detect if digital pads are present (A pad is an adjustment of a digital signal, in one of a predetermined number of different ways, to emulate or mimic the attenuation that would have occurred if the signal had been sent on an analog line rather than a digital line. By noting the systematic padding of the probe signal, the modems may adjust their transmission characteristics to compensate for such padding).

4) detect if the channel is restricted/unrestricted (minimum 1's density issues)

5) detect any digital impairments that we are currently unaware of (since the system sends all 256 codes).

6) detect all of these things without violating transmit power requirements of −15 dBm transmit level measured over 3 seconds and 0 dBm measured over 250 ms.

Another aspect of the invention relates to the data phase: how can the modems transmit the fastest possible speed given the impairments that are on the line/data communication channel. The present system has the ability to:

1) transmit over any end-to-end digital channel (throughout this specification, except where the context may require otherwise, the term transmit may also be used to mean receive or simply operate.")

2) transmit at speeds of 56K or faster (up to 64K) including intermediate speeds of 62,666 bps, 61,333 bps, 60,000 bps, 58,666 bps, 57,333 bps. Many other systems can not transmit at these intermediate speeds. This is accomplished by sending 7 databits/byte (+1 non-data bit) in any slot where a RBS bit is present and sending 8 data bits/byte in any slot where a RBS bit is not present.

3) transmit over digital channels that are restricted (i.e. they have a minimum one's density requirement). We do this with zero byte suppression: any time we get 7 0's in a row, insert a 1.

4) transmit over digital channels that have digital pads. We can do this by using a mapping scheme such that the receiver knows that transmitted codes get mapped into a different set of codes after the pad, so the receiver needs to "undo" this mapping. And, any codes that are doubly mapped (i.e. 2 or more transmitted codes get mapped into the same code after the pad) are not sent by the transmitter.

5) Prevent compression by the network: Sometimes the network will monitor the first 6 seconds of the call to see how compressible the data is, and if it is compressible, it will compress it. We prevent this by transmitting scrambled data which will look like wideband white noise.

6) Minimize overhead bits used by the zero byte suppresser. By scrambling the data into white noise, the number of bytes that require action by the zero byte suppresser are a controlled small number of bytes that is independent of the data that the user or protocol is sending.

The present method can determine the exact number and exact location of the RBS which allows faster data transmission than known methods. This is so because if there is just 1 bit robbed by RBS, the preferred method and apparatus described herein may transmit at up to 62,666 bps. In fact, with any number or robbed bits between 1 and 5, the preferred method and apparatus provide data transfer rates in excess of 56 Kbps. In a typical network connection, 0–3 robbed bits may be encountered. Finding 4–6 robbed bits appears to be fairly rare.

With respect to the one's density requirement, the present system can detect if we need to avoid sending too many 0's in a row. We can compensate for this in several methods. First, we could just transmit at 56K (and set the LSB=1) which will fix the problem. Or, we could run the "zero byte suppresser" which is an algorithm that inserts a 1 into the data stream if it sees 7 0's in a row and we could run at a faster speed. Third, we could run a scrambler on- the data which will make the number of times that we send too many zeros (and would make the zero byte suppresser kick in) very controlled (since the output is basically white noise.

The presently described system will detect the "digital impairment" of digital attenuator pads and could compensate for it, running at a reduced speed, but still running faster than an analog modem. Because the present system sends all 256 PCM codes, if there are any digital impairments that we are currently unaware of, it is very likely that we could detect and handle them with our current SQA sequence.

A typical digital network may see a transmitted data stream as being compressible. If, however, the transmitted data stream is compressed by the network, the data stream will likely be corrupted and the connection may fail. Use of a scrambler as described herein, on the other hand, makes the transmitted data stream appear as wide-band white noise (i.e. uncompressible). Therefore, the network will not compress the transmitted data stream.

In accordance with the presently preferred embodiment, where an ISDN to ISDN (basic rate or primary rate) connection is determined to be all digital, digital data transfer at rates up to 64 kbps/B channel full-duplex can be achieved while the customer is billed for an analog call, which is typically billed at a lower rate than a customer would be billed for a digital call. If an ISDN to T1/E1, or T1/E1 to T1/E1, connection is determined to be all digital, digital data transfer rates of up to 62.666 kbps/B channel full-duplex can be achieved.

The method and apparatus of the present invention may be used in association with 56 Kbps, or higher, transmission speed modems, ISDN modems, and rack modem products. In addition, with the inclusion of a scrambler and a zero-byte suppresser, higher data rates can be achieved. With prior art, 56 kbps maximum can be achieved over the channel. With current art, up to 64 kbps can be achieved.

Finally, the present device provides added robustness to the communication. The scrambler and zero byte suppresser enable the communication to be successful in situations when the prior art would fail to connect.

Figure 7:
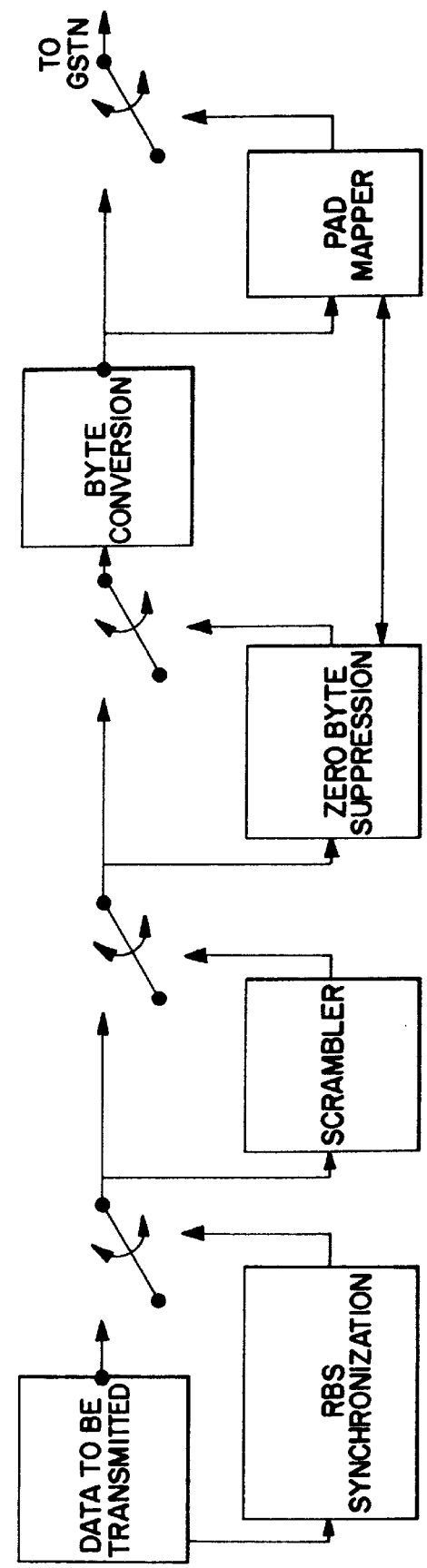
FIG. 7 is a block diagram of a transmitter in the calling device and the answering device shown in FIG. 1.

The operation of a transmitter and a receiver will now be described with reference to FIG. 7. Note that each block shown in FIG. 7, except for Byte Conversion, may be turned on or off individually to meet the requirements of the particular network channel:

RBS synchronization

Each modem's transmitter is synchronized with the remote modem's receiver which is synchronized with the robbed bits in that particular network path (if any are present). The transmitter takes advantage of the fact that it knows if a robbed bit is present in each of the six possible time slots. Each time slot is 8 bits (one byte) long, and the six time slots are periodic i.e., if there is a robed bit in the first time slot, there will be a robbed bit in every sixth byte thereafter (in the same time slot) and these bits together we call "one robbed bit". So, there is a possibility of having from 0–6 robbed bits.

In any time slot where there is a robbed bit, the transmitter will only transmit 7 bits of user data. The $8^{th}$ bit will be forced to binary one and will be placed in the position of the robbed bit (this happens in the Byte Conversion routine). With this method, the 7 bits of user data will not be corrupted by the RBS, only the $8^{th}$ bit (not user data) will be corrupted.

In any time slot where there is not a robbed bit, the transmitter will transmit the full 8 bits of user data. These bits will not be corrupted by RBS because we know that it is not present in these time slots. Because we are synchronized with the robbed bit signaling (RBS) in the network and we know the exact number and location of the robbed bits, we can take full advantage of all available information bandwidth in the digital channel.

Scrambler

The scrambler takes the output of the previous section (which will be either 7 or 8 bits) and scrambles it using standard scrambling techniques to create wide-band white noise energy. In certain networks, the network will monitor the call for a duration of time to determine if the data is compressible. If it is, the network will compress the data. This would entirely corrupt the communication between two digital modems. To prevent the network from turning on the compressors, we can scramble the data. In addition, the scrambler will create a statistically controlled output which will minimize the output of the Zero Byte Suppresser.

Zero Byte Suppression

The zero byte suppresser takes the output from the previous section (which will be either 7 or 8 bits) and runs it through the following algorithm: If there are ever 7 bits of "binary zero" in a row, insert a "binary one" into the data stream. This algorithm ensures that minimum one's density requirements are met in the network. Note that this routine outputs the same number of bits that it received as an input and it buffers any additional data caused by the bit insertion. The buffered data is combined with the input of the next byte. If there is ever enough data buffered to transmit entirely out of the buffer, that action will be performed.

Byte Conversion

The byte conversion routine will output 8 bits of data. If its input was 8 bits, it passes the input data to its output without changing it. If its input was 7 bits, it will insert a "binary one" into the byte at the location where the robbed bit will be, and it will output the 8 bits.

Pad Mapper

The pad mapper takes the output from the previous section (which will be 8 bits) and it maps the data in such a way as to avoid sending any PCM codes that (due to the digital pad) would result in an ambiguous code at the receiver. Note that if the Zero Byte Suppression and the Pad Mapper are turned on at the same time, they will need to share information to ensure that their respective functions are achieved.

The final output is transmitted onto a digital link on the General Switched Telephone Network. The receiver of the remote modem will have knowledge of which of the above blocks are turned on in the transmitter and knowledge of any additional specific information about the transmitter's configuration that it needs in order to reverse the operations of the transmitter and decode the data.

The description above is sufficient to enable one of ordinary skill in the art to implement the present invention. Nonetheless, to provide additional details regarding the present system, an assembler code listing for a method of implementing certain aspects of the presently described device is provided in the microfiche appendix. The code has been written for use with a Texas Instruments' TMS320C51 digital signal processor. A User's Guide for the TMS320C5x series of processors is readily available to those of ordinary skill in the art and may be useful to the novice in understanding the commands set forth in the microfiche appendix.

What is claimed is:

1. A method for determining characteristics of a data communication channel between first and second data communication devices comprising, in combination:

sending a relatively low power digital probe signal over said channel from said first to said second data communication devices;

sending a second digital probe signal corresponding to an analog signal having a relatively high-frequency signal with a time-varying dc component from said first to said second data communication devices, wherein said relatively high frequency signal is greater than 3,300 Hertz: and detecting a received signal at said second data communication device, said received signal corresponding to said probe signals sent by said first device, and determining whether said received signal varies from a predetermined standard.

2. A method as claimed in claim 1, wherein said relatively high frequency signal is substantially equal to 4,000 Hertz.

3. A method as claimed in claim 1, wherein said relatively high frequency signal has an amplitude of approximately one-half of a maximum amplitude permitted for said channel.

4. A method as claimed in claim 1, wherein said probe signal is synchronized between said first and said second data communication device.

5. A method as claimed in claim 4, wherein said probe signal includes a total number of bytes substantially equally divisible by 6.

6. A method as claimed in claim 1, wherein said method further comprises sending a third, substantially all-zero, probe signal.

7. A method as claimed in claim 1, wherein said step of determining whether said received signal varies from a predetermined standard includes determining whether robbed bit signaling has affected a probe signal.

8. A method as claimed in claim 7, wherein said step of determining whether said received signal varies from a predetermined standard further comprises at least one of determining a number of robbed bits, and determining a location of a robbed bit.

9. A method as claimed in claim 6, wherein said step of determining whether said received signal varies from a predetermined standard includes determining whether digital ones have been inserted in a probe signal.

10. A method as claimed in claim 1, wherein said step of determining whether said received signal varies from a predetermined standard includes determining whether a probe signal has passed through a digital pad.

11. A method as claimed in claim 1, wherein said step of determining whether said received signal varies from a predetermined standard includes monitoring said received signal for a digital signal corresponding to an analog signal having a relatively high-frequency signal with a time-varying dc component.

12. A method as claimed in claim 1, wherein said second probe signal comprises a sequence of digital codewords.

13. A method as claimed in claim 12, wherein said sequence of digital codewords comprises 256 distinct codewords.

14. A method as claimed in claim 13, wherein said 256 distinct codewords correspond to a series of levels associated with a 256 level quantizer.

15. A method as claimed in claim 1, wherein said relatively low power digital probe signal is of sufficient length so that an average power of at least said low power digital probe signal and said second digital probe signal is less than a predetermined threshold.

16. A method for determining a characteristic of a communication channel between a first communication device and a second communication device, comprising the steps of:
   transmitting a probe signal over said channel from said first communication device to said second communication device, said probe signal having three subparts, the three subparts comprising:
   a first subpart that comprises a low power probe signal;
   a second subpart that comprises a substantially all-zero probe signal; and
   a third subpart that comprises a digital probe signal corresponding to an analog signal having a frequency that is greater than 3,300 Hz and a time-varying dc component;
   detecting a received signal corresponding to said probe signal; and
   comparing said received signal to said probe signal.

17. A method as claimed in claim 16, wherein said probe signal comprises a sequence of 8-bit PCM codewords.

18. A method as claimed in claim 16, wherein said probe signal consists of a number of codewords, said number being a multiple of 6.

19. A method as claimed in claim 16, wherein said first subpart decreases an average power associated with said probe signal.

20. A method as claimed in claim 16, wherein said second subpart in said received signal indicates whether said channel is at least one of a restricted channel and a clear channel.

21. A method as claimed in claim 16, wherein said time-varying dc component associated with said third subpart comprises a sequence of codewords that, when applied to a quantizer, produces an increasing dc offset voltage.

22. A method as claimed in claim 16, wherein said transmitting step is repeated until a predetermined response is received.

23. A method as claimed in claim 16, wherein the first communication device is an answering modem.

24. A method as claimed in claim 16, wherein the first communication device is a calling modem.

25. A digital signal processor programmed with a set of instructions to perform the method of claim 16.

* * * * *